A. T. SMITH.
ENVELOPE OPENER.
APPLICATION FILED FEB. 7, 1921.
1,408,415.
Patented Feb. 28, 1922.
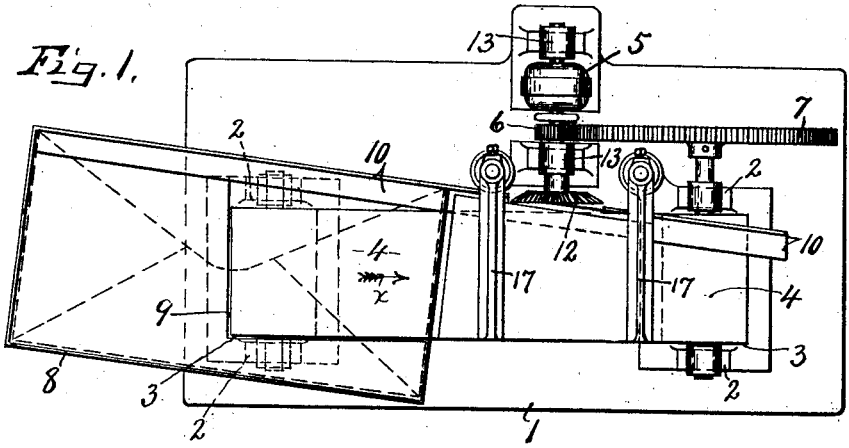
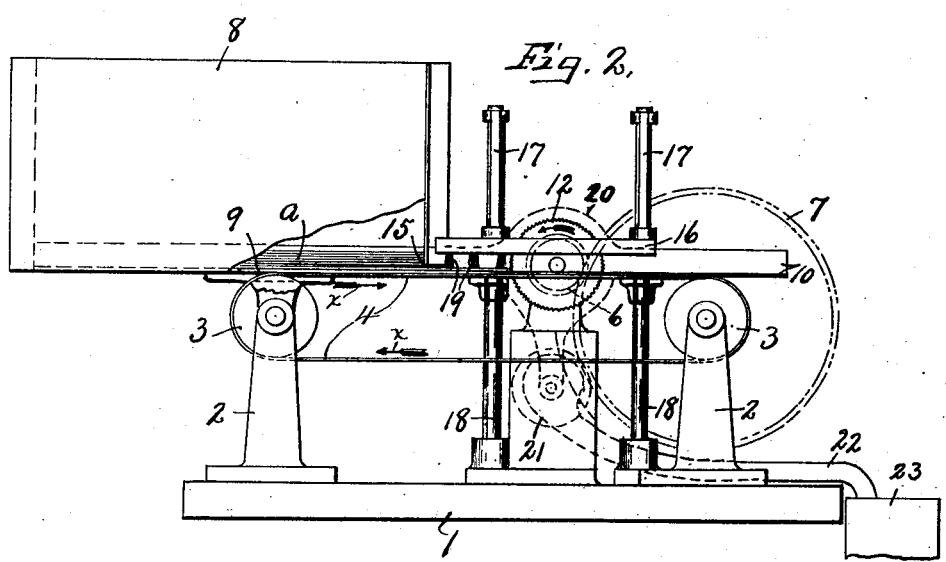
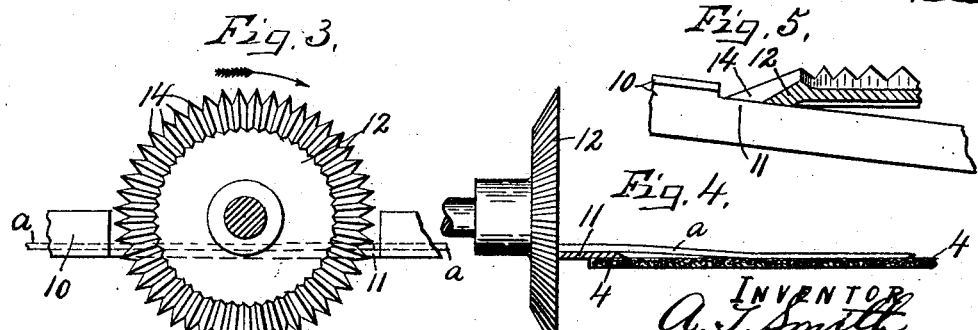
INVENTOR
A. T. Smith
By
Howard P. Denison
ATTORNEY.

UNITED STATES PATENT OFFICE.

ALVA T. SMITH, OF SYRACUSE, NEW YORK.

ENVELOPE OPENER.

1,408,415.  Specification of Letters Patent.  Patented Feb. 28, 1922.

Application filed February 7, 1921. Serial No. 443,319.

*To all whom it may concern:*

Be it known that I, ALVA T. SMITH, of Syracuse, in the county of Onondaga, in the State of New York, have invented new and useful Improvements in Envelope Openers, of which the following, taken in connection with the accompanying drawings, is a full, clear, and exact description.

This invention relates to an envelope opening machine having means for feeding the envelopes one by one from a stack along a suitable edge guide which is diagonal to the direction of the movement of the feeding means in combination with a power driven rotary cutter having shearing coaction with a portion of the guide for severing the edge of the envelope in transit along said guide.

The main object is to provide simple and efficient means for automatically feeding the envelopes one by one from a stack and cutting an extremely small strip from the edges thereof as they are successively fed to the cutter.

One of the specific objects is to arrange the guide and conveyer belt in such relation as to cause the edges of the envelopes to hug the guide in transit to and beyond the cutter so as to assure the cutting of a narrow strip from said edge throughout the length of the envelope without the use of any other guiding means.

Another specific object is to provide the cutter with V shape cutting teeth for shearing coaction with a relatively stationary shearing blade which is preferably arranged in the plane below that of the axis of the cutter so as to reduce to a minimum the resistance of said cutter to the forward feed of the envelope by its conveyer belt.

Another object is to provide simple and efficient means for holding back the envelopes of the stack except the bottom one which is in direct contact with the conveyer belt and to thereby assure the feeding of the lowermost envelopes one at a time to the cutter.

A further object is to provide means for driving the cutter and conveyer belt from the same source of power and in such manner that the cutter will be driven at a much higher speed than that of the conveyer.

Other objects and uses relating to specific parts of the machine will be brought out in the following description:

In the drawings:

Fig. 1 is a top plan of an envelope opening machine embodying the various features of my invention.

Fig. 2 is a side elevation of the same machine except that a part of the receptacle for the stack of envelopes is broken away.

Fig. 3 is an enlarged outer face view of the cutter and adjacent portion of the shearing plate or envelope guide with which it co-operates to shear the edge of the envelope.

Fig. 4 is a side elevation of the cutter shown in Fig. 3 together with the adjacent portions of the envelope guide or shearing plate and conveyer belt and also showing an envelope in operative position for cutting the edge thereof.

Fig. 5 is an enlarged horizontal section of a portion of the cutter showing the adjacent portion of the guide plate with which the teeth of the cutter have shearing coaction.

As illustrated this machine comprises a base —1— having upright standards —2— in spaced relation lengthwise thereof for receiving and supporting a pair of rotary drums —3— which carry an endless conveyer belt —4— having its upper side disposed in substantially a horizontal plane. Suitable means is provided for driving the conveyer belt —4— in the direction indicated by arrow *x* Figs. 1 and 2, said means consisting of, in this instance, an electric motor —5— having its armature shaft provided with a pinion —6— meshing with a relatively large gear —7— on the shaft of one of the drums —3—, preferably the shaft of the right hand drum Fig. 2 so that the greatest tension will be transmitted to the upper side of the belt to keep the latter in a substantially horizontal plane when the machine is in operation.

The envelopes to be opened are preferably stacked in a box or receptacle —8— which is supported upon the upper ends of the left hand standards —2— directly over the receiving end of the conveyer belt —4— which extends a considerable distance under the receptacle to form a movable portion of the bottom thereof, said receptacle having its bottom portion adjacent the belt cut away at —9— to allow the major portion of the lowermost envelope of the stack to rest upon the belt so that the friction between the belt and the lowermost envelope will cause the latter to be fed from under the stack in the direction of movement of the upper portion of the belt as indicated by arrow *x* Fig. 1.

The receptacle —8— extends diagonally of the belt or at an angle to the direction of travel of the upper portion thereof and is provided along its lower rear corner with an angular guide rail —10— which extends forwardly from the receptacle along and in close proximity to the upper side of the conveyer belt —4— and preferably beyond the drum —3— at the discharge end of the belt so as to carry the opened envelopes clear of the conveyer where they may be collected in any suitable receptacle provided therefor. This guide rail forms a portion of the bottom and rear side of the receptacle —8— and is disposed in a plane intersecting the line of travel of the rear edge of the upper portion of the belt —4— so that the end of the guide at the infeed end of the conveyer belt is at the rear side of the belt while the other end overlies the delivery end of the conveyer belt and it, therefore, follows that the feeding force of the belt acting upon the envelope causes it to travel along and to lie edgewise against the guide.

This guide is preferably made of metal such as hard steel and the portion thereof which crosses the adjacent edge of the upper portion of the belt constitutes what may be termed a stationary shearing blade —11— for shearing coaction with a rotary cutter —12—.

This rotary cutter is journaled in suitable bearings —13— on the main supporting frame —1— to rotate about a horizontal axis parallel with that of the drums —3—, or in vertical plane at right angles to that of the rear edge of the belt in close shearing coaction with the adjacent edge of the shearing blade —11— to sever the adjacent edge of the envelope as —*a*— as the latter is conveyed along the guide —10— and shearing blade —11— by the belt —4—.

The plane of rotation of the cutting edge of the cutter —12— is at a slight angle to and just in-side of the upright guide flange of the guide —10— against which the edge of the envelope rides while the latter is being drawn from the bottom of the receptacle —8— to and past the cutter which serves to cut off or trim an extremely narrow portion of the adjacent edge of the envelope but sufficient to open the same to permit the contents thereof to be easily removed without liability of mutilating said contents.

By attaching the cutter —12— directly to the shaft of the electric motor —5—, it may be driven at a relatively high speed as compared with the speed of movement of the envelope as effected by the conveyer belt —4— and in order that the speed of movement of the envelopes by the conveyer belt may not be materially retarded by the cutting operation, the cutter is provided with specially formed V-shape teeth —14— having their cutting edges at comparatively sharp acute angles to the radial lines drawn through the points thereof as distinguished from cutters of the circular disk type, the object being to provide a circumferential series of separate cutters operating in rapid succession upon the edge of the envelope, each cutting a little at a time so as to break the continuity of resistance as would be the case if the cutting edge were continuous throughout the periphery.

As a further means for reducing the resistance to the feed of the envelopes by the conveyer, the lower guide flange of the guide —10— and its shearing blade —11— are disposed in a plane below that of the axis of the rotary cutter —12— as shown in Figs. 3 and 4, the object of which is to enable the cutting edge of each V-shape tooth to impinge the adjacent edge of the envelope to be cut against the shearing blade with an easy shearing action as will be apparent upon reference to Fig. 3 in which the edge of the envelope is just passing between a downwardly moving tooth and adjacent edge of the shearing blade, the angle between said edge and shearing blade being almost negligible and yet sufficient to produce the desired shearing effect with a minimum resistance to the forward feeding of the envelope.

In order that the lowermost envelopes of the stack may be successively fed one by one from the receptacle —8— by frictional engagement by the underlying belt —3—, the end of the receptacle facing the direction of movement of the upper side of the belt is closed except for a relatively small slot —15— just above the belt extending upwardly from the belt or rather from the horizontal ledge or flange of the guide —10—, a distance sufficient to permit the passage of an ordinary envelope therethrough when carried along by the upper side of the belt, the superposed portions of the wall serving to hold the other envelopes against forward feeding.

Directly over the belt and in advance of the receptacle —8— is a brush-holder —16— supported by brackets —17— which in turn are mounted upon upright standards —18— carried by the base —1—, the brush-holder being provided with transverse rows of brushes —19— having their lower edges lying in close proximity to the upper surfaces of the belt to ride upon the face of the envelope which is being carried along by said belt and thereby to exert a sufficient pressure against the belt to assure its proper feeding to and past the cutter and at the same time serving in a measure to hold back any superposed envelope which may tend to feed along with the envelope adjacent the belt, it being understood that the surface of the belt will probably be made of rubber, leather or equivalent material having a maximum degree of frictional feeding power against the adjacent envelope while any envelope which may rest upon the one adjacent the belt will have less frictional feeding power applied thereto, thereby assisting the brush in holding the superposed envelopes from advancing with the ones in contact with the belt.

Assuming that the conveyer belt and cutter are in action and that the parts are adjusted for performing their respective functions, then by placing a stack of envelopes in the receptacle —8— so that the corresponding lengthwise edges thereof will rest on the guide —10—, then the weight of the envelope of the stack will cause the one at the bottom to be frictionally engaged by the belt which will separate it from the superposed envelopes and feed it along the guide to and past the cutter, thereby permitting the cutter to shear off an extremely narrow strip along the edge adjacent the guide, this operation being continued as each bottom envelope is successively withdrawn from the stack, the opened envelopes being discharged from the delivery end of the belt and guide into any suitable receptacle not shown.

This operation is practically automatic and continuous, and therefore, any number of envelopes may be stacked in the receptacle so that the only work on the part of the operator is to restack the unopened envelopes in said receptacle.

It will be understood that the diagonal arrangement of the guide —10— relative to the direction of movement of the belt will cause the edges of the envelopes to hug closely to the guide while they are being fed by the conveyer thereby assuring the opening of the entire edges of the envelopes adjacent the cutter without the use of any further guiding means.

If necessary, the cutter may be partially enclosed by housing —20— to protect the operator from contact therewith and also to guide the clippings through an outlet in the bottom of the housing where they may be withdrawn by a suction device as —21— indicated by dotted lines in Fig. 2 and discharged through a conduit —22— into a receptacle as —23— also indicated by dotted lines in Fig. 2.

What I claim is:

1. In a machine for opening envelopes, the combination of a rotary cutter, a conveyer belt movable transversely of the axis of the cutter, a receptacle for stacked envelopes to be opened overhanging a portion of the conveyer belt and having an opening in its bottom to allow the lowermost envelope of the stack to rest upon the underlying belt, and a guide extending from one side of the receptacle to the cutter at an acute angle to the axis of rotation of said cutter.

2. A machine for opening envelopes, comprising a receptacle in which the envelopes to be opened are stacked, an endless conveyer belt having one side movable in a substantially horizontal plane and forming a part of the bottom of the receptacle to allow the lowermost envelope of the stack to rest thereon and to be withdrawn from the stack by frictional engagement with the belt, means for holding back the remaining envelopes of the stack above the one engaged by the belt, a guide extending from one side of the receptacle in the direction of movement and across one edge of the upper side of the belt diagonally thereto and a rotary cutter having peripheral cutting teeth in shearing co-action with a portion of the guide near its point of crossing the edge of the belt.

3. A machine for opening envelopes, comprising a receptacle in which the envelopes to be opened are stacked, an endless conveyer belt having one side movable in a substantially horizontal plane and forming a part of the bottom of the receptacle to allow the lowermost envelope of the stack to rest thereon and to be withdrawn from the stack by frictional engagement with the belt, means for holding back the remaining envelopes of the stack above the one engaged by the belt, a guide extending from one side of the receptacle in the direction of movement and across one edge of the upper side of the belt diagonally thereto and a rotary cutter having the peripheral cutting teeth in shearing coaction with a portion of the guide near its point of crossing the edge of the belt, and mechanism for driving the cutter and belt in synchronous relation.

4. A machine for opening envelopes, comprising a receptacle in which the envelopes to be opened are stacked, an endless conveyer belt having one side movable in a substantially horizontal plane and forming a part of the bottom of the receptacle to allow the lowermost envelope of the stack to rest thereon and to be withdrawn from the stack by frictional engagement with the belt, means for holding back the remaining envelopes of the stack above the one engaged by the belt, a guide extending from one side of the receptacle in the direction of movement and across one edge of the upper side of the belt diagonally thereto, a rotary cutter having peripheral cutting teeth in shearing coaction with a portion of the guide near its point of crossing the edge of the belt, and mechanism for driving the cutter and belt in synchronous relation but at different speeds.

5. A machine for opening envelopes, comprising a receptacle in which the envelopes to be opened are stacked, an endless conveyer belt having one side movable in a substantially horizontal plane and forming a part of the bottom of the receptacle to allow the lowermost envelope of the stack to rest thereon and to be withdrawn from the stack by frictional engagement with the belt, means for holding back the remaining envelopes of the stack above the one engaged by the belt, a guide extending from one side of the receptacle in the direction of movement and across one edge of the upper side of the belt diagonally thereto, a rotary cutter having peripheral cutting teeth in shearing coaction with a portion of the guide near its point of crossing the edge of the belt, and a suction device for withdrawing the clippings from the cutter.

In witness whereof I have hereunto set my hand this 29th day of January, 1920.

ALVA T. SMITH.

Witnesses:
H. E. Chase,
M. R. Cooke.